United States Patent Office.

WILLIAM T. SHERMAN, OF MARENGO, OHIO.

Letters Patent No. 113,459, dated April 4, 1871.

IMPROVEMENT IN COMPOUNDS FOR CURE OF FOOT-ROT IN SHEEP.

The Schedule referred to in these Letters Patent and making part of the same.

*To all whom it may concern:*

Be it known that I, WILLIAM T. SHERMAN, of Marengo, in the county of Morrow and State of Ohio, have invented certain new and useful Improvements in Specifics for the Cure of "Foot-Rot" in Sheep; and I do hereby declare that the following is a full, clear, and exact description thereof, reference being had to the accompanying drawing and to the letters of reference marked thereon which form a part of this specification.

The nature of my discovery consists in compounding a specific for the cure of foot-rot in sheep, as will be hereinafter fully set forth.

To enable others to avail themselves of the benefit arising from my discovery, I will now make known the ingredients composing it, and the manner of compounding the same.

I take three (3) ounces blue vitriol, three (3) ounces white vitriol, three (3) ounces verdigris, three (3) ounces gunpowder, half pint alcohol, half pint spirits of turpentine, half pint of vinegar, two (2) ounces butter of antimony, and one pint chamber-lye. Mix all of the above thoroughly together and put in a stone jug and cork tightly.

Manner of Using.

Eradicate as far as possible the disaffected parts of the hoof by means of a sharp knife or other suitable instrument; then wash out thoroughly with water, and apply the compound with a swab, or other convenient means, after shaking well. The animal thus treated should be turned out on clean pasture and allowed to remain there until completely restored.

Having thus set forth the nature of my discovery, What I claim, and desire to secure by Letters Patent, is—

The compound, composed substantially of the ingredients herein named, for the purpose set forth.

In testimony that I claim the foregoing as my own, I affix my signature in presence of two witnesses.

WM. T. SHERMAN.

Witnesses:
R. L. NOE,
WM. LEONARD.